United States Patent [19]

Crigler

[11] Patent Number: 4,917,712

[45] Date of Patent: Apr. 17, 1990

[54] METHOD AND APPARATUS FOR FILTERING CONDITIONED AIR AND SEPARATING DUST FROM REUSABLE WASTE

[75] Inventor: Benjamin R. Crigler, Atlanta, Ga.

[73] Assignee: Crigler Enterprises, Atlanta, Ga.

[21] Appl. No.: 275,007

[22] Filed: Nov. 22, 1988

[51] Int. Cl.$^4$ ............................................. B01D 46/04
[52] U.S. Cl. ........................................ 55/96; 55/97; 55/304; 55/372; 55/378; 55/429; 55/432; 55/473; 55/510
[58] Field of Search .................... 55/96, 300, 304, 372, 55/373, 378, 503, 505, 510, 515, 516, 527, 385.1, 498, 432, 472, 467, 429, 97, 487, 473

[56] References Cited

U.S. PATENT DOCUMENTS

| | | | |
|---|---|---|---|
| 3,485,671 | 12/1969 | Stephens | 55/429 X |
| 4,541,846 | 9/1985 | Sjodin | 55/97 |
| 4,705,467 | 11/1987 | Bakker | 55/300 X |
| 4,735,639 | 4/1988 | Johnstone | 55/429 X |
| 4,759,781 | 7/1988 | Olson | 55/273 |
| 4,764,191 | 8/1988 | Morelli | 55/432 X |

Primary Examiner—Charles Hart
Attorney, Agent, or Firm—Hurt, Richardson, Garner, Todd & Cadenhead

[57] ABSTRACT

A compact pneumatic air filter system for filtering conditioned air laden with dust and reusable debris is disclosed, which has an initial filter stage for collecting reusable debris from air and separately storing it for reuse, and a secondary filter system for collecting remaining dust from air for disposal and re-releasing conditioned air to a work environment. The system utilizes alternating positive and negative air pressures to move debris and dirt to appropriate storage spaces within the system, and to move filtered air back into the work environment by migration through filter walls, thereby retaining the conditioned property of the filtered air.

21 Claims, 4 Drawing Sheets

METHOD AND APPARATUS FOR FILTERING CONDITIONED AIR AND SEPARATING DUST FROM REUSABLE WASTE

BACKGROUND OF THE INVENTION

1. Field of the Invention

This invention involves a device for removing paper fibers and dust from air traversing a pneumatic conveying system used in conjunction with printers or other waste fiber producing mechanisms. The invention removes waste fibers and dust from the working environment and pneumatically separates the dust from the fiber, retaining waste paper debris and paper fiber for recycling and collecting dust for disposal while returning purified conditioned air to the work environment.

2. Description of the Prior Art

In industrial environments such as printing plants and paper converting plants, large amounts of paper debris and paper fibers are generated by the operation of printers and/or paper cutters where scraps of paper are produced. Debris, fibers and dust are required to be removed from the air to maintain a healthy working environment. Generally, such waste is produced in an environment where air is conditioned to maintain a comfortable work place for employees. The normal mode of operation to purify conditioned air is to remove unfiltered air through a conduit to an exterior filtering device, and exhuast the air either to the outdoor environment or return it to the work environment, in either case losing much of the conditioned property of the air. Thus, there exists a need within the art to remove the debris and fibers of paper or other such material from the working environment without the loss of the conditioned property of air (heated or cooled).

Paper debris and paper fibers also have monetary value when collected for recycling. Such debris, when collected, accumulates dust and dirt from the environment and it is desirable to retain the large debris fiber in a compact form for recycling while at the same time, removing the dust from the fibers for disposal.

While several systems are known which accomplish similar or partially similar tasks of filtering air, no invention is known which meets all of the objectives of the present invention.

For example, known to the applicant are Krantz, U.S Pat. No. 4,581,050, and Higgins, U.S. Pat. No. 3,826,066. Each disclose double wall filter bag constructions where there is an annular space between bags. An inner bag separates larger particles from the waste stream, and the outer bag removes finer particles and acts as a second filter. Multi-stage dust removal systems are also disclosed in Dupre, U.S. Pat. No. 4,224,044. Paper balers are also commonly used within the industry. None of the prior art, however, accomplishes all of the objectives of the present system within a single unit or according to the present method. The present invention provides a waste removal system for conditioned air which eliminates the gain or loss of temperature of the filtered air and separates waste such that reusable waste is rid of dirt, segregated, and compacted for recycling, while dirt and dust are accumulated for disposal.

SUMMARY OF THE INVENTION

The solution to the problem of paper fiber and debris removal from air, while retaining conditioned air within the working environment and simulatneously compacting paper relieved of dirt and dust for recycling is encompassed within the present invention. Conditioned air carrying both paper debris fibers and dirt particles is pneumatically carried through the disclosed invention, whereby unfiltered air is forced into the inner bag of a double bag filter system. Paper debris and paper fiber are collected and deposited in a baler connected to the inner bag while air and dirt enter the outer bag. Some air escapes to the environment through the outer bag wall, leaving dust behind, with most of the dust laden air within the outer bag being carried to a secondary filter system. Clean air is released by migration of air through the porous wall of the secondary filter system and dust is collected for disposal. The results are threefold: conditioned air is retained and purified within the working environment, and paper debris is rid of dirt and dust and then baled for recycling, all within the same system. Flow throughout the system of air, dust and debris is regulated by alternating positive and negative air pressures within the system.

It is one object of the invention to provide an air filtering system for conditioned air which removes non-gaseous particles from said air while retaining the conditioned properties of the air and returning it to the internal work environment.

It is another object of the invention to provide an air filtering system which is compact enough to be retained within the work environment that it serves and which separates dirt and dust from reusable waste particles contained within unfiltered air.

It is a further object of the invention to process reusable waste into a compact form for recycling and to separately collect dirt and dust particles removed from air for disposal.

It is yet another object of the invention to enhance the quality of recyclable waste by removing dirt and dust particles therefrom.

The preferred embodiment of the method and apparatus for filtering air and separating dust from reusable waste as described herein is characterized by a pneumatic conveying system comprised of an initial filter system having double filter bags or tubes of dissimilar fabrics with the outer bag concentrically enveloping the inner bag. Unfiltered air is drawn and deflected downward into the inner bag. Air carrying dust exits the mesh wall of the inner bag, migrating into the space between the outer and inner bags. A chute connected to a paper baler beneath the inner bag catches paper and large fibers which are forced downward by gravity, air flow, and momentum as the large particles hit the deflector. A portion of the air migrates through the pores of the outer bag wall, depositing dust on the inner wall of the outer bag. The remaining dust and air are drawn through the dust fan and deposited in a secondary bag where the dust is collected and air escapes through the walls of the secondary filter. Thus, air migrates in a filtered state to the work environment rather than being exhausted to an external environment. The dust fan is intermittently operated to alternately create positive and negative air pressures throughout the system, causing both the initial and secondary filter bags to palpitate thereby releasing dust and paper accumulated on the filter walls.

DETAILED DESCRIPTION OF THE PREFERRED EMBODIMENT

Figure 1:
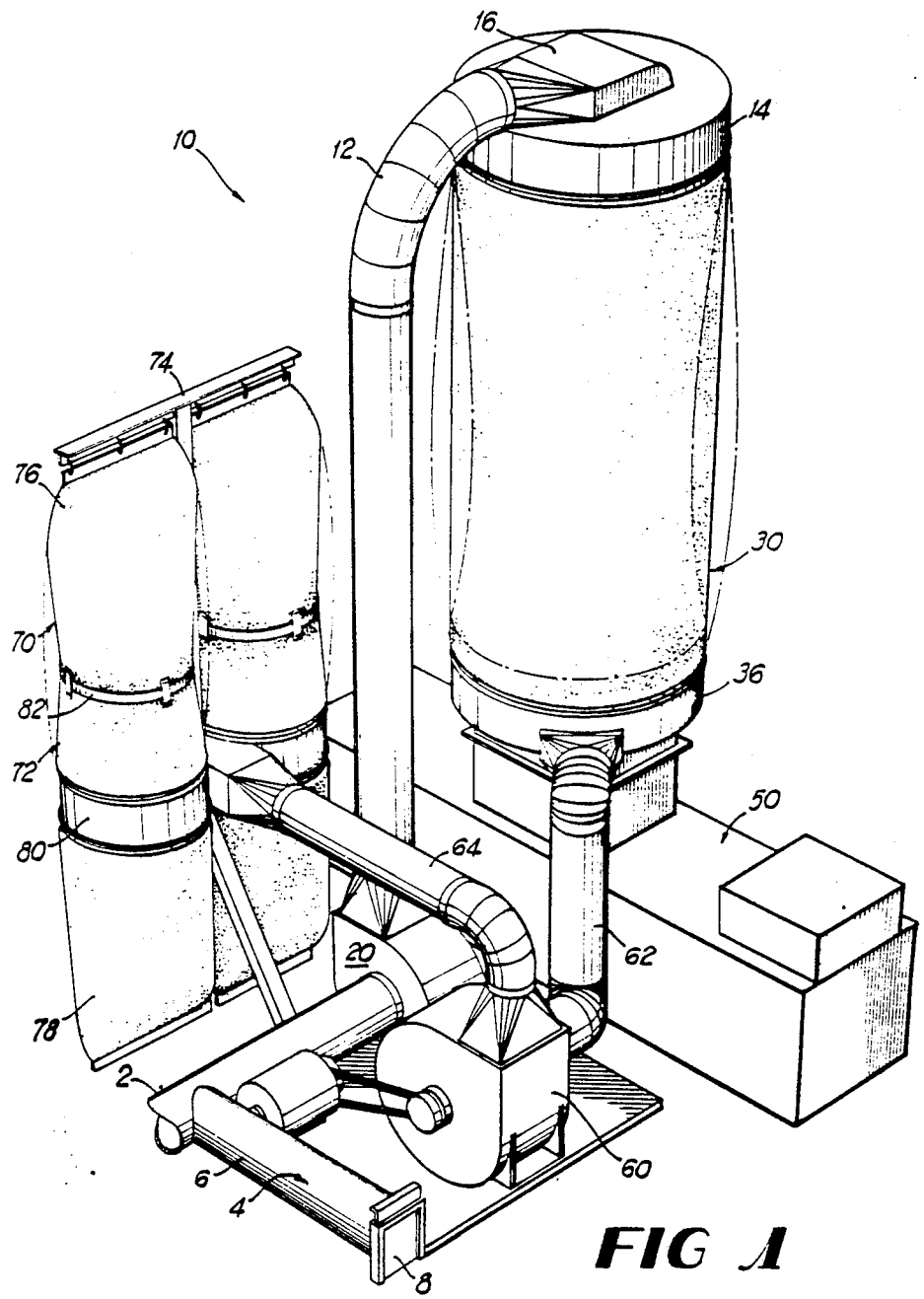
FIG. 1 is a perspective view of the present invention, connected to a floor pipe which delivers air to be purified to the apparatus from any mechanism or machinery which produces recyclable debris.
Figure 2:
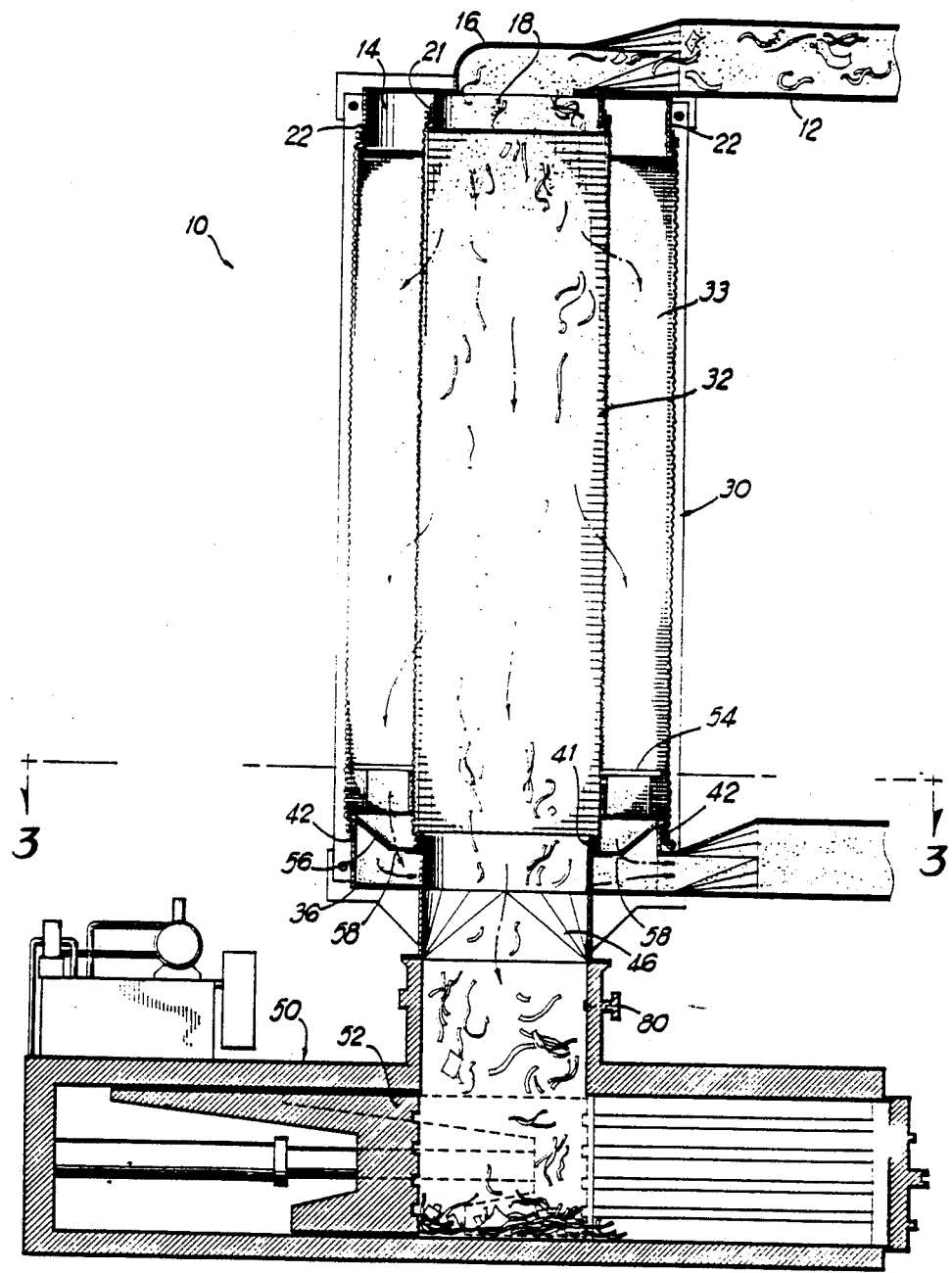
FIG. 2 is a cross-sectional view of the double bag and baling assembly of the present invention, illustrating the internal operation of the bags and baler.
Figure 3:
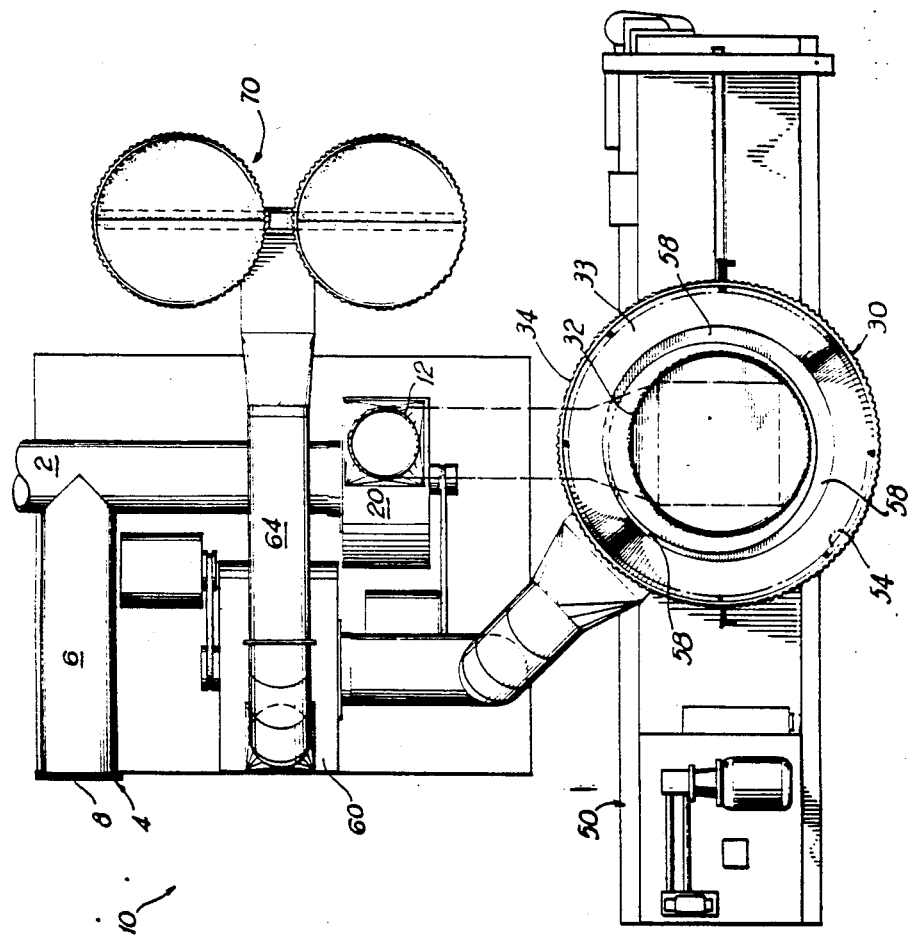
FIG. 3 is a top plan view of the present invention.
Figure 4:
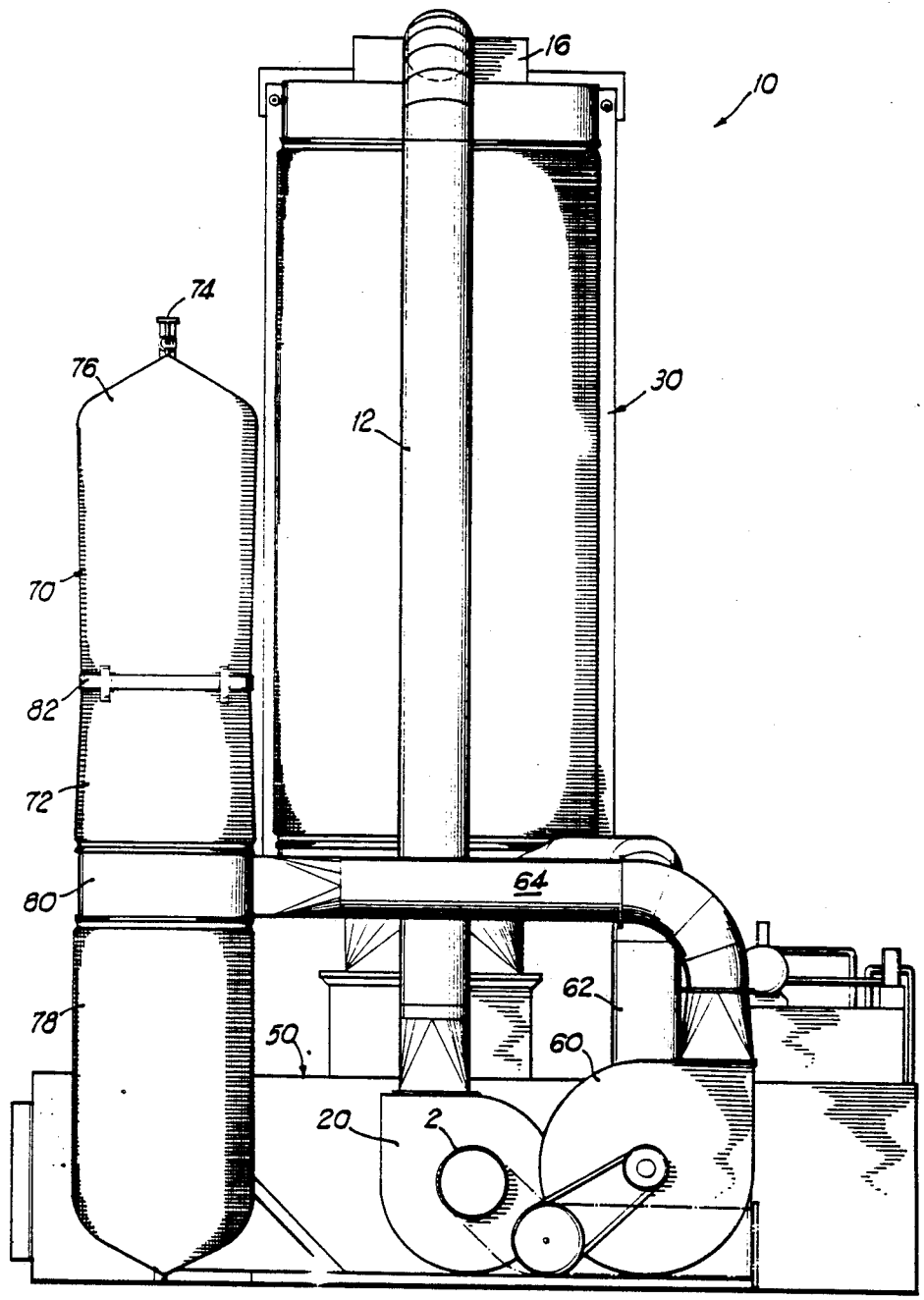
FIG. 4 is a side elevational view of the present invention.

A preferred exemplary embodiment of my invention is illustrated in FIGS. 1-4, wherein like numerals represent like parts. The method and apparatus for filtering conditioned air and separating dust from reusable waste is primarily designed for removing paper debris and fiber and dust from conditioned air used in conjunction with printers and paper cutting mechanisms which produce paper scraps. The device is, however, not limited to removing paper debris, but can be used in conjunction with any mechanism that produces a recyclable waste product. Such examples would be wood working mechanisms where sawdust and wood chips are produced, or in metal grinding or molding operations where metal shavings are generated.

As a general overview, the method and apparatus for filtering air and separating dust for reusable waste is driven by a double fan system. A system fan 20 draws conditioned air filled with dust, paper debris and paper fibers to the initial filter stage 30. Reusable debris and fibers are separated and drawn into a baler 50 while dust laden air is drawn away from the initial filter 30 to a secondary filter by means of a dust fan 60. The dust fan is operated intermittently, such that positive and negative air pressures are created within the system causing the initial and secondary filter bags to palpitate, thereby releasing the particle build-up on filter walls.

In the preferred embodiment the filtering system 10 is connected to any mechanism which produces a waste-rich air stream such as a printer or paper cutter by means of a floor pipe 2 or other means. A system fan 20 draws unfiltered air from the floor pipe 2 into the filtering system 10. The the waste rich air stream is delivered to the floor pipe 2 and thus into the system from any remote area of the work environment in any suitable manner. A sweeping mechanism 4 is attached to the floor pipe 2 such that additional debris, such as floor sweepings, can be manually inserted into the system. The sweeping mechanism 4 is essentially a tributary pipe 6 connected to the floor pipe 2 and includes a trap door 8 by which floor sweepings, dirt, and debris can be manually swept into the filtering system 10.

The system fan 20 creates suction from the floor pipe 2 and positively forces the unfiltered air up through a delivery pipe 12 to the initial filter 30.

The initial filter 30 consists of a double bag or double tube filter where the inner bag 32 is concentrically contained within an outer bag 34 such that an annular space 33 is maintained between the bags. The double bag arrangement is supported from above by a doughnut shaped duct 14 having a deflector 16 covering the hole 18 in the duct 14. Steel bands 21 and 22 form the inner and outer casings of the top duct 14 and support the inner and outer bags 32 and 34, respectively, so that the annular space 33 is maintained therebetween. The bottom of the double bag arrangement is supported by a lower doughnut shaped duct 36 with a hole 38 having inner and outer steel bands 41 and 42 as support casings.

The inner tube 32 is secured about the holes 18 and 38 of the ducts 14 and 36, respectively, by inner steel bands 21 and 41, while the outer bag 34 is supported by the respective exterior steel bands 22 and 42 of the ducts 14 and 36.

The delivery tube 12 delivers unfiltered air from the system fan 20, carrying reusable debris combined with dust and dirt to duct 14. An approximate velocity of 5000 ft. per minute is an optimal speed at which the filter system carries unfiltered air through the system. A deflector 16 directs the air downwardly into the inner tube 32 which is composed of a mesh material such that air and dust particles can easily migrate to the annular space 33, but large particles and debris are retained therewithin. A second air drawing system or dust fan is disposed adjacent the lower duct 36 of the initial filter system. The dust fan is intermittently operated and creates a negative air pressure within the initial filter system. Air and dust escape through the coarse mesh comprising the wall of the inner bag 32, to the annular space 33 between inner and outer bags 32 and 34 due to the draw created within the annular space by operation of the dust fan.

Paper fiber and debris, by gravity and momentum created when air is deflected, travel downwardly inside the inner bag 32. Extending upwardly through the hole 38 of the lower duct connected to steel band 41 is a passage chute 46 which connects the interior space of the inner tube 32 to a baler 50. Reusable debris and fiber falls through the inner tube 32 to the passage chute 46 and into the baler 50. A ram 52 extends forwardly to compact the debris within the baler.

The outer bag 34 is made of a fabric material such as a non-woven polyester or tight weave fabric, so that some air can migrate through outer bag wall 34, but dust particles remain therewithin. Thus, some air escapes from the initial filter stage returning directly to the work environment, leaving dust particles caked on the inner wall of the outer tube 34.

The remaining dust and air from the initial filter are passed through the duct 36. The lower doughnut shaped duct 36 is capped around the "doughnut" portion which defines the annular space 33 with a perforated steel grid 54. A collar 56, having walls sloping inwardly toward the hole 38 of the duct 36 is located beneath the steel grid 54. The top of the collar is concentric with the steel grid 54. The bottom of the collar approaches but does not contact the inner steel band 41 forming the duct hole 38. The bottom of the collar is eccentric with the hole 38 of the duct 36 formed such that an eccentrically shaped gap 58 is formed between the bottom of the collar 56 and the inner steel band 41 of the duct with said gap 58 being narrow on one side of the duct 36 and gradually widening as it extends to the opposite side. Located adjacent the doughnut shaped duct 36 at the point where the gap 58 between the collar 56 and the inner steel band 41 is narrowest, is an exit pipe 62 which connects the lower doughnut shaped duct 36 to the dust fan 60. By means of the collar 56 within the duct 36, air and dust are drawn uniformly through the steel grid 54 by the dust fan 60 thereby exiting the initial filter 30. The widening gap 58 allows the suction to be increased along the portions of the duct 36 furthest from the dust fan 60. The dust fan 60 then expels the dust laden air through a second delivery pipe 64 to a secondary filter system 70.

The secondary filter sYstem 70 has a plurality of filter bags 72 hanging from a frame 74. Each secondary filter bag 72 has a top portion 76 and a bottom portion 78 connected by a hollow support drum 80. The support drums 80 are connected to the second delivery pipe 64. Dust laden air is blown into the secondary bags 72 which are made of a flexible fabric material. Clean air escapes through the cloth wall of the top portion of the secondary bag 76 while dust collects on the inner wall of the top portion of the bag 76 and drops to the bottom portion 78. When the bottom portion of a secondary bag 74 is full it can be removed and emptied.

At both filter stages 30 and 70, dust and/or fiber and debris is caked on the inner wall of a filter bag and then drops off to be drawn and collected for removal. Caked dust is forced to drop by palpitations of both the inner and outer bags 32 and 34 and the secondary bags 72. Palpitations are achieved by creating positive and negative air pressure throughout the system. The system fan 20 is operated continuously, while the dust fan is periodically cycled on and off, changing the amount of air pressure in each of the bags causing palpitations, and thereby releasing dust and/or paper caked on the wall surfaces.

When the dust fan 60 is cycled off, a positive air pressure is created in the initial filter system, expanding the inner and outer bags 32 and 34 of the initial filter system. The secondary filter bags 72 retract simulatneously with the expansion of the initial filter system. Restarting the dust fan causes the outer bag 34 to retract, thereby causing dust to drop from the walls to be sucked through the steel grid 54 and the secondary bag 72 to expand. The cycle-off time on the dust fan is actuated by a limit switch 100 on the baler which activates the ram 52 to move forward. As the ram moves forwardly the chute 46 is sealed to avoid dust falling into the baler when the dust fan 60 is not operating and drawing air through the annular space 33.

On the secondary bag 72, an elastic band 82 is placed around the upper portion 76 of the bag. The band 82 contracts when the dust fan is cycled off and the bag retracts, thereby aiding in the palpitation of the secondary bag 72. When the dust fan is operating, a positive air pressure is created within the secondary bags such that the clean air is released to the atmosphere through the fabric of the bags. No exhaust is necessary for the system since all air is released through the outer bag wall or the secondary bag during periods when the bags are independently inflated.

From the foregoing detailed description of the preferred embodiment it is seen that a method and apparatus for filtering air and separating dust from reusable waste is provided which collects conditioned unfiltered air from the environment and returns it in a filtered state without removing the air from the work environment thereby retaining its conditioned property. Reusable waste is collected free of dust and dirt, and compacted into a baler for recycling while dirt and dust are separately collected for disposal. The invention is a compact filter system for an industrial environment which maintains a clean atmosphere while reclaiming valuable, reusable waste products.

Many modifications are contemplated within the design of the preferred embodiment. For instance, as one goal of the present invention is to maintain the temperature of conditioned air, thus requiring filtering within the internal work environment, filter bags of varying heights and capacities may be used to accommodate the individual plant needs. It is to be understood that the form of the invention herewith shown and described is to be taken as a preferred example of the same and that various changes in size, shape, material, arrangement and assembly method of parts may be made without departing from the original spirit of the invention or the scope of the subjoined claims.

I claim:

1. An apparatus for filtering air containing reusable debris and dust and collecting the reusable debris for recycling separately from dust collected for disposal comprising:
   (a) an initial filter system for collecting unfiltered air and segregating reusable debris from dust and air having an inner filter tube, an outer filter tube, and an annular space between said tubes such that said inner filter tube is concentrically contained within said outer tube, said inner tube having pores such that large debris is retained within said tube and air and dust escape to said annular space, said outer tube having smaller pores than said inner tubes such that dust is retained within said annular space, but air may escape from said outer tube to the environment and including upper and lower support means for said inner and outer tubes for maintaining concentricity;
   (b) a first conduit for receiving unfiltered air and delivering said air downwardly into said inner tube;
   (c) a first fan means for drawing unfiltered air through said first conduit and forcefully depositing unfiltered air within said inner tube means, thereby creating a positive air flow within said initial filter system;
   (d) a baler disposed beneath said inner tube for receiving reusable waste from said inner tube for compacting and storing said reusable waste therein;
   (e) a secondary filter system having a plurality of filter bags for receiving dust laden air, said filter bags having pores such that air escapes through said pores to said work environment but dust is retained within said bags;
   (f) a second conduit connected to said outer tube for receiving partially filtered air from said initial filter system, said second conduit communicating with said secondary filter system; and
   (g) a second fan means connected to said second conduit for drawing said air and dust out of said outer tube by creating suction within said initial filter system for positively forcing said dust and air into said secondary filter system through said second conduit.

2. An air filtering apparatus as defined in claim 1, wherein said baler is further comprised of an entry chute, a storage space for accumulating reusable debris and a ram, wherein said ram operates along a horizontal axis for compacting reusable waste within said storage space.

3. An air filtering apparatus as defined in claim 2, in which said ram seals off said chute from entry of debris when said ram assumes a forward position for compacting said reusable waste.

4. An air filtering apparatus as defined in claim 1, wherein said first fan means is continuously operated causing a positive air pressure within said initial filter system.

5. An air filtering apparatus as defined in claim 4, wherein said second fan means is intermitttently operated such that said second fan means, when operating, reduces air pressure within said initial filter system and increases air pressure within said secondary filter system thereby causing said inner and outer tubes of said initial filter system and said filter bags of said secondary filter system to palpitate and thereby release any dust and debris caked on said tubes and bags.

6. An air filtering apparatus as defined in claim 5 wherein said baler is comprised of a storage space for accumulating reusable debris and a ram, where said ram operates along a horizontal axis for compacting reusable waste within said storage space and said ram seals off said baler when said ram assumes a forward position for compacting reusable waste.

7. An air filtering apparatus as defined in claim 6 further comprising a limit switch whereby said limit switch deactivates said second fan means when said ram is moved to a forward position.

8. An air filtering apparatus as defined in claim 1, wherein each of said upper support means and said lower support means of said initial filter system is a doughnut shaped duct having an inner ring wall and an outer ring wall, said inner tube being supported between said inner ring walls and said outer tube means being supported between said outer ring walls, where said upper duct is connected to said first conduit means and further has a deflector for delivering unfiltered air downward into said inner tube and where said lower duct is connected to said second conduit means.

9. An air filtering system as defined in claim 8, whereby said lower duct is further comprised of a perforated steel grid situated between said annular space and said lower duct such that air and dust may be drawn into said lower duct from said annular space.

10. An air filtering system as defined in claim 8, where said lower duct is further comprised of a collar disposed beneath said steel grid, said collar being of equal diameter and concentric to said outer ring wall of said lower duct where said collar meets said steel grid, said collar having a wall sloping inward toward the inner ring wall of said duct thereby forming a gap between said inner ring wall and said collar such that the bottom of said collar is eccentric relative to said inner ring wall of said duct.

11. An air filtering system as defined in claim 10, whereby said second conduit is connected to said lower duct means such that second conduit is disposed below said collar.

12. An air filtering apparatus as defined in claim 5, where each said filter bags of said secondary filter system have a lower bag portion and an upper bag portion and an open drum situated between said upper and lower portions, each of said drums being connected to said second conduit.

13. An air filtering apparatus as defined in claim 12, said secondary filter system having a frame support means, each of said filter bags being hung from said frame support means.

14. An air filter system as defined in claim 12, where each of said filter bags includes an elastic band disposed around said upper bag for enhancing the palpitation of said filter bags by retracting each time air pressure is reduced within said bags.

15. An air filtering apparatus as defined in claim 12, whereby air entering each of said secondary filter bags is directed upward into said upper bag portion and dust is collected for disposal in said lower bag portion.

16. An apparatus for filtering air containing reusable waste and dust, and collecting reusable waste for recycling separately from dust collected for disposal comprising:

(a) an initial filter for collecting unfiltered air having an upper entrance duct, a lower exit duct, an inner filter tube, and an annular space between said tubes, said inner tube having large pores such that debris and large fibers are maintained within said inner tube and small particles and dust may migrate to said annular space, said outer tube having smaller pores such that air is released but dust is retained therein, said upper entrance duct being connected to said inner tube and said lower exit duct being connected to said outer tube;

(b) a collection area disposed beneath said inner tube for accumulating debris retained within said inner tube;

(c) a first fan means for delivering unfiltered air to said inner tube, said fan means creating a positive air pressure within said initial filter means thereby inflating said initial filter means;

(d) a second fan means for drawing partially filtered air out of said outer tube, said second fan being operated intermittently and creating a negative pressure within, said initial filter means thereby retracting said initial filter means and releasing waste trapped in said outer tube and said inner tube; and (e) a secondary filter means having a top portion and bottom portion for receiving air and dust from said second fan means and releasing air through said porous walls, said second fan means intermittently creating a positive pressure within said second filter, for expanding said walls during the operation of said fan and causing said walls to retract during the off-cycle of said fan for releasing dust accumulated on said walls.

17. An air filtering apparatus as defined in claim 16, wherein said upper entrance duct and said lower entrance duct of said initial filter system have an inner ring wall and an outer ring wall, said inner tube being supported between said inner ring walls and said outer tube means being supported between said outer ring walls, said upper duct being connected to said first conduit means and further including a deflector for delivering unfiltered air downwardly into said inner tube and said lower duct being connected to said second conduit means.

18. An air filtering system as defined in claim 17, whereby said lower duct is further comprised of a perforated steel grid situated between said annular space and said lower duct such that air and dust may be drawn into said lower duct from said annular space.

19. An air filtering system as defined in claim 17, where said lower duct is further comprised of a collar disposed beneath said steel grid, said collar being of equal diameter and concentric to said outer ring wall of said lower duct where said collar meets said steel grid, said collar having a wall sloping inwardly toward the inner ring wall of said duct for forming a gap between said inner ring wall and said collar such that the bottom of said collar is eccentric relative to said inner ring wall of said duct.

20. An air filtering system as defined in claim 19, wherein said second conduit is connected to said lower duct means such that second conduit is disposed below said collar.

21. A method for filtering air containing reusable debris and dust and collecting reusable debris for recyling separately from dust collected for disposal comprising the steps of:

(a) delivering unfiltered air to an initial filter system having inner and outer filter tubes of dissimilar fabrics and an annular space therebetween, said inner tube having large pores for the retention of large debris, and passage of air and dust therethrough and an outer tube having smaller pores for retention of dust and passage of air therethrough, said air being directed downwardly into the inner tube;

(b) retaining said large debris within said inner tube and allowing said debris to drop to a collection station located beneath said inner tube;

(c) drawing air and dust out of said inner tube by a second fan means and by pressure created from said first fan means allowing some of said air to migrate through said outer tube and depositing dust thereon;

(d) drawing remaining dust and air within said outer tube to a secondary filter means comprised of a fabric bag with pores for allowing air to escape and retaining dust by said second fan means; and (e) palpitating said initial and secondary filters to release dust and debris deposited thereon by intermittently operating said second fan means for decreasing air pressure in said first filter means and increasing pressure in said second filter means.

* * * * *